(12) United States Patent
McComas

(10) Patent No.: US 12,286,739 B2
(45) Date of Patent: Apr. 29, 2025

(54) YARN TENSION AND BREAKAGE SENSOR SYSTEM

(71) Applicant: Gary M McComas, Lewisburg, WV (US)

(72) Inventor: Gary M McComas, Lewisburg, WV (US)

( * ) Notice: Subject to any disclaimer, the term of this patent is extended or adjusted under 35 U.S.C. 154(b) by 276 days.

(21) Appl. No.: 17/650,368

(22) Filed: Feb. 8, 2022

(65) Prior Publication Data

US 2022/0282416 A1    Sep. 8, 2022

Related U.S. Application Data

(63) Continuation-in-part of application No. 16/553,664, filed on Aug. 28, 2019, now Pat. No. 11,242,216.

(60) Provisional application No. 62/723,547, filed on Aug. 28, 2018.

(51) Int. Cl.
| | | |
|---|---|---|
| *D05B 19/12* | (2006.01) | |
| *D05C 13/02* | (2006.01) | |
| *G01L 5/04* | (2006.01) | |
| *G05B 19/406* | (2006.01) | |

(52) U.S. Cl.
CPC .............. *D05C 13/02* (2013.01); *G01L 5/047* (2013.01); *G05B 19/406* (2013.01); *G05B 2219/45196* (2013.01)

(58) Field of Classification Search
CPC ....... G01L 5/047; B65H 63/036; D05C 15/18; D05C 5/02; D05C 5/04; D05B 19/12; D05B 69/36

See application file for complete search history.

(56) References Cited

U.S. PATENT DOCUMENTS

| | | | | | |
|---|---|---|---|---|---|
| 4,078,505 A | * | 3/1978 | Fitton | ................... | D05C 15/18 |
| | | | | | 200/61.18 |
| 4,522,139 A | * | 6/1985 | Beverly | ................ | D05C 15/18 |
| | | | | | 112/273 |
| 4,807,829 A | * | 2/1989 | Zollinger | ............. | B65H 63/036 |
| | | | | | 200/61.18 |
| 4,970,974 A | * | 11/1990 | Price | ...................... | D05C 15/18 |
| | | | | | 200/61.18 |
| 5,588,383 A | * | 12/1996 | Davis | ..................... | D05C 15/24 |
| | | | | | 112/80.16 |
| 5,662,054 A | * | 9/1997 | Bardsley | ................ | D05C 15/18 |
| | | | | | 112/470.01 |

(Continued)

*Primary Examiner* — Nathan E Durham
(74) *Attorney, Agent, or Firm* — Kimberly O Snead

(57) ABSTRACT

A yarn monitoring system for textile machines uses sensors to indicate yarn over-tensioning and breakage. The sensors within eyelets monitor the passage of the yarn and send new signals to the controller. The eyelets, each with a sensor, are within a body containing a circuit board which is in constant communication with the sensors and software contained within a controller. The controller is in constant communication with the textile machine. The software contains an acceptable operational zone for new signal data and control limits establishing the lowest new signal data reading permitted for the yarn. The user establishes set points for the control limits, and reaching these set points is an indication of over-tension or yarn breakage. To prevent unnecessary shut down of the machine, the software averages the new signal data and, when the new signal average remains out of the established set points, initiates communication to the textile machine.

18 Claims, 10 Drawing Sheets

(56) References Cited

U.S. PATENT DOCUMENTS

2009/0260402 A1* 10/2009 Hicks ................ B65H 63/0324
66/163

* cited by examiner

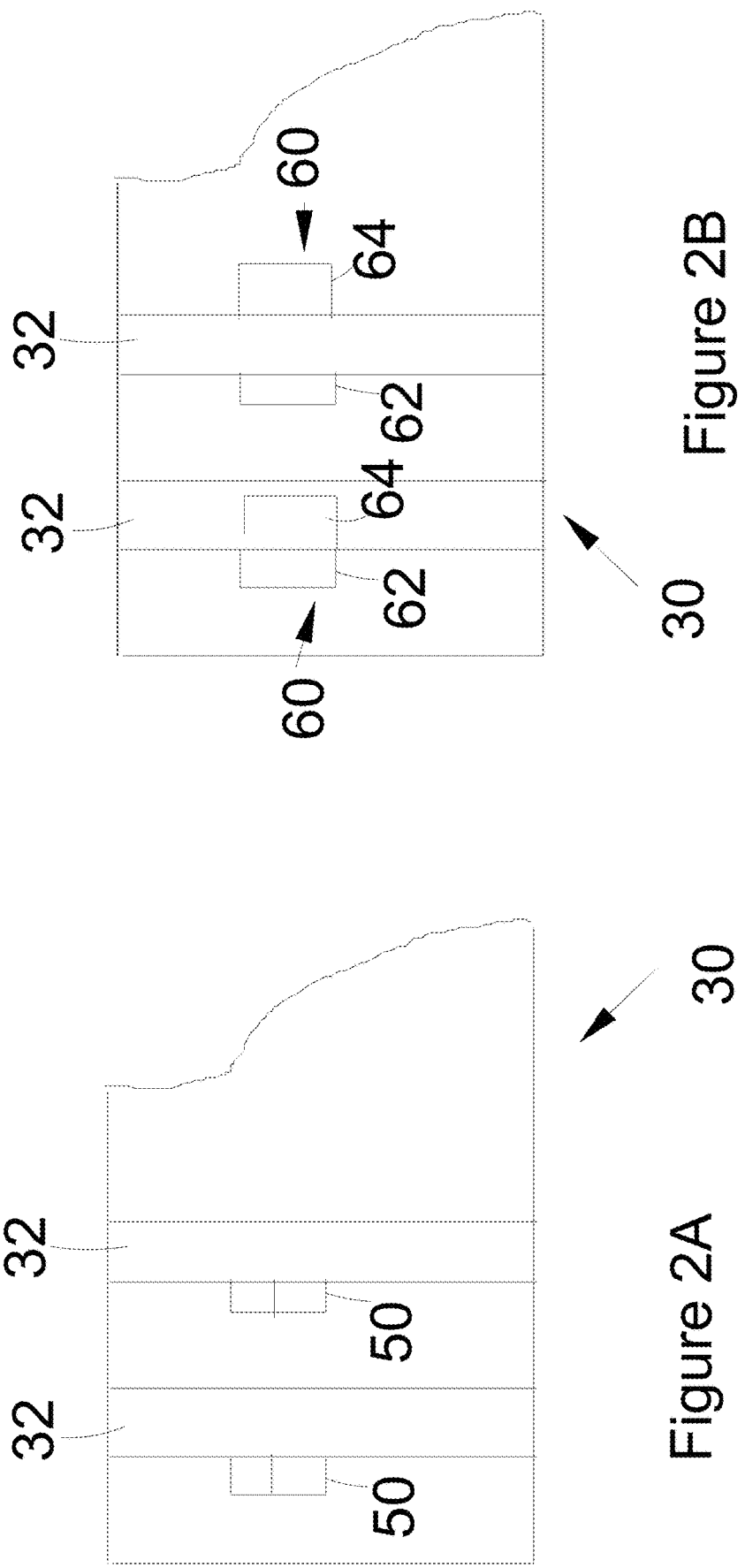

YARN TENSION AND BREAKAGE SENSOR SYSTEM

FIELD OF THE INVENTION

The invention relates to a sensing system for monitoring the tension and breakage of yarn on a textile machine.

BACKGROUND OF INVENTION

A number of textile improvements have sought to monitor tension and breakage in textile machines, however for the most part these monitoring devices have been mechanical. There has been some use of optical sensors, frequently in combination with mechanical members, to indicate breakage. Tension, however, is more difficult to monitor optically and has been primarily indicated through mechanical members.

The sensors most commonly used in monitoring devices are piezoelectric sensors which are less accurate and more prone to effects environmental conditions, such as humidity. Additionally, typical monitoring systems cannot measure tension without the use of mechanical members which are prone to error and breakage. Although the detection of breakage is critical, stopping the machine before the yarn breaks saves a great deal of time in the production process.

SUMMARY OF THE INVENTION

A system using sensors transmitting data to software for the monitoring of tension and breakage of yarn in a textile machine is disclosed. A sensor bar contains multiple eyelets to receive the yarn, each of the multiple eyelets containing at least one sensor, preferably optical. The sensors can be reflective or transmissive with equal accuracy. The microprocessor, housed in a controller, contains software that is in constant communication with each of the sensors to receive and analyze the raw signals created by the yarn motion. The sensors register the motion of the yarn, both wiggle and speed, with the signals being received and analyzed by the software within the microprocessor in milliseconds. The microprocessor is also in two-way communication with the textile machine.

To initiate the system the user enters a user defined broken yarn set point that defines how long a raw signal can stay below the broken yarn control limit, thereby establishing that the yarn is broken. Also entered is a user defined tight end set point to define how many times the raw signal average can drop below the tight end control limit, thereby establishing that the yarn is over-tensioned.

Once the machine is started empirical values inherent in the software algorithm are initiated. The empirical values include tight end control limit, broken yarn control limit, factors for averaging of yarn motion, and features and characteristics of yarn types and textile machine types. The tight end control limit defines the lowest reading permitted for the yarn, and after a number of drops below this limit as defined by the tight end set point, the algorithm determines that the yarn is too tight. The broken yarn control limit determines the lowest reading permitted for the yarn, and after a period of time below this limit as defined by the broken yarn set point, the algorithm determines that the yarn is broken.

Once the values are loaded the system scans each of the sensors, receiving and analyzing the raw signals to generate raw signal data. As they are received the raw signals are compared to the empirical control limit for a broken end. If the raw signals are above the empirical control limit for a broken end, the raw signals are added to an existing running data average, or raw signal average, thus constantly creating an updated running data average. The updated running data average is compared to the predefined empirical control limit for a tight end. If the updated running data average is above the predefined empirical control limit for a tight end, the system loops back to scanning the sensors.

When the raw signals fall below the control limit for a broken end for the time defined by the broken end set point, a broken yarn command is sent by the system to shut down operation of the machine. The system isolates the sensor with the broken yarn and once repaired, the machine is restarted.

BRIEF DESCRIPTION OF THE DRAWINGS

These and other objects, features, advantages, and aspects of the present invention can be better understood with reference to the following detailed description of the preferred embodiments when read in conjunction with the appended drawing figures.

FIG. 2A is a cutaway end view of the sensor placement within the sensor bar in accordance with the disclosed invention;

FIG. 2B is a cutaway end view of an alternate sensor placement within the sensor bar in accordance with the disclosed invention;

DETAILED DESCRIPTION OF THE INVENTION

Figure 1:
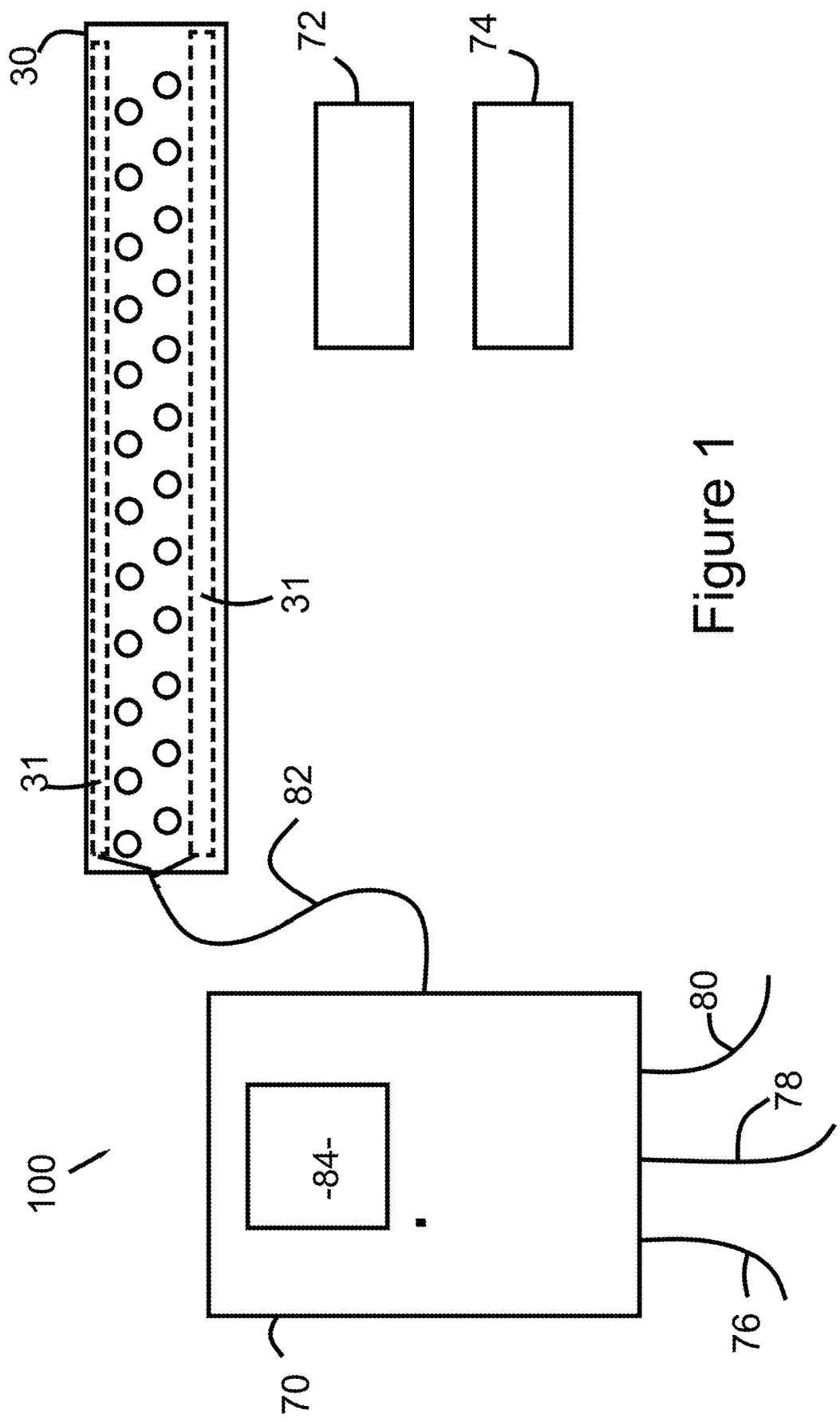
FIG. 1 is a block diagram of an example equipment configuration in accordance with the disclosed invention.

As used herein the term "sensing bar" shall refer to a collection of sensors that mounts on a textile machine, each sensor having a single yarn for monitoring.

As used herein the term "yarn" or "thread" shall refer to multiple strands of filament for use in textile machines.

As used herein the term "data point" and "data points" shall refer to a voltage reading somewhere between +Voltage (+V) and ground (GND). This point is determined by the condition (presence, tension, or absence) of the yarn as read by the sensors.

As used herein the term "eyelet" shall refer to a receiving and guide aperture for yarn in accordance with the invention.

As used herein the term "sensor" shall refer to the combination of emitter and detector elements of a sensor, whether these are a single physical element or two physical elements.

As used herein the term "yarn motion" shall refer to any motion of the yarn as it moves past the sensor, including but not limited to wiggle, and vertical movement.

As used herein the term "wiggle" shall refer to the side-to-side motion made by the yarn as it passes past a sensor. Unless over tight, and ready to break, yarn has some degree of horizontal movement along its length.

As used herein the term "new signal" shall refer to the signal created by the sensor and communicated to the controller.

As used herein the term "new signal data" shall refer to the new, or raw, signal data points received from the sensor by the controller.

As used herein the term "tight end" shall refer to the condition of over-tensioned yarn.

As used herein the term "tight end control limit" shall refer to the lowest reading permitted for the yarn, below which the algorithm determines that the yarn is too tight.

As used herein the term "broken yarn control limit" shall refer to the lowest reading permitted for the yarn, below which the algorithm determines that the yarn is broken after a user-entered number of new signal readings are below this limit.

As used herein the term "operational zone" is the area above the control limit within which the yarn is progressing with normal motion.

As used herein the term "averaging" shall refer to the ongoing accumulation and analysis of new signal data received by the controller from each of the sensors. The value obtained by averaging is a moving average defined by the yarn type and machine type being used in the system, the characteristics and features of which are known by the controller algorithm.

As used herein the term "new signal average" is the value of the sensor readings determined by averaging new signal data.

As used herein the term "broken yarn set point" shall refer to value entered by a user that indicates how long a new signal can stay below the broken yarn control limit, thereby establishing that the yarn is broken.

As used herein the term "averaged set point" and "tight end set point" shall be used interchangeably and refer to the value entered by a user that indicates how long the new signal average can stay below the tight end control limit, thereby establishing that the yarn is over-tensioned.

The pending application is a continuation-in-part of U.S. Ser. No. 16/553,664 filed Aug. 28, 2019, with a priority date of Aug. 28, 2018, and is incorporated herein as though recited in full.

Tension and breakage of yarn must be carefully monitored in order to produce viable products. Tension that is too great will cause uneven yarns, marring the finished product, and is generally a precursor to yarn breakage. It is therefore beneficial to the operation of a textile machine such as a tufting machine to catch the over-tensioning of yarn prior to either breakage or causing a flaw in the finished product. Conversely, under-tensioning can result in loose threads and thread loops. The present invention discloses a sensor system that improves yarn management by detecting tight, over-tensioned yarn as well as broken yarn. The disclosed sensor system monitors the tension and breakage of the yarn during the operation of a textile machine through the use of one or more optical sensors located in or adjacent to yarn eyelets. The sensors are in communication with a controller running an algorithm that can determine yarn motion based on the sensor readings. The operation of the textile machine can be controlled as needed depending on the detection of a broken or over-tensioned yarn. Each of the sensors in the sensor system has an ID, and the controller software knows the location of any sensor having issues and maintains the machine in shutdown until repaired. The optical sensors used in the disclosed system can be photoelectric sensors, using infrared, visible, or laser light. Although photoelectric infrared sensors are used as examples herein, any sensor that can provide the required data can be used. The disclosed sensor system can be retrofitted to current machines or incorporated into machines by the manufacturer.

A typical tufting machine of the above noted co-pending application is illustrated in FIG. 1 and can be referenced as to the general state of the art of one of the machines to which the disclosed sensor system is applicable. Other machines, such as knitting, weaving, non-woven, etc., can readily use the disclosed sensor system with minor re-dimensioning of the sensor bar. For ease of description herein, the sensor system is being described in conjunction with a tufting machines, however other applications will be evident to those skilled in the art.

A block diagram of the sensor system 100 is illustrated in FIG. 1 showing the sensor bar 30 connected, through the circuit board 31, to the controller 70. The connection between the circuit board 31 and the controller 70 can be wired, such as an RS485 com link 82, or wireless. The controller 70 is a microprocessor, connected to a power source through cable 76, having sufficient computing to run the required algorithms and standard averaging software, display graphics, and maintain databases, etc. The controller 70 is connected to an on/off or override switch on the textile machine through connection 78 to enable the controller 70 to shut down the textile machine upon the identification of predetermined criteria as noted hereinafter. Control line 80 connects the controller 70 directly to the machine (not shown) to enable the controller 70 to know when the machine is running and when it is stopped through the presence or absence of voltage. The controller 70 preferably has the ability to send output to a remote display 72 and printer 74 for standard reporting of machine status and can also contain a display 84 directly on the controller 70 to provide any visual readings necessary in addition to, or instead of, the display 72. The interaction between a controller 70 and the auxiliary input and output devices, including alarms, is known and the appropriate set up will be evident to those skilled in the art. Although communication can be wireless, hardwired communication is preferable in order to avoid the loss of communication that can occur with wireless. Additional elements, alarms, lights, etc., to indicate that the machine has been stopped can also be incorporated and the addition of such will be known to those skilled in the art.

In the example illustrated herein the circuit board 31 is positioned on the sides of the sensor bar 30 and data is fed into the controller 70 through wiring 82. Other configurations of the circuit board 31 within the sensor bar 30 can be used and the optimal positioning will be known to those skilled in the art. It is critical that the circuit board 31 does not block the movement of the yarn and that clear sensor readings are enabled.

The optical sensor signal is gathered by the circuit board 31, sent to the microprocessor within the controller 70, and, depending on the sensors being used, either converted from analog to digital or used directly. The microprocessor reads the signal voltage and compares the voltage received from all sensors to the preprogrammed voltage range.

The circuit board 31 within the sensor bar 30 carries the sensor electronics and is secured to the sensor bar 30 in any manner known in the art that will not obstruct the path of the yarn. The circuit board 31 is responsible for transmitting the signals received from the sensors 50, 60 to a microprocessor.

Figure 2:
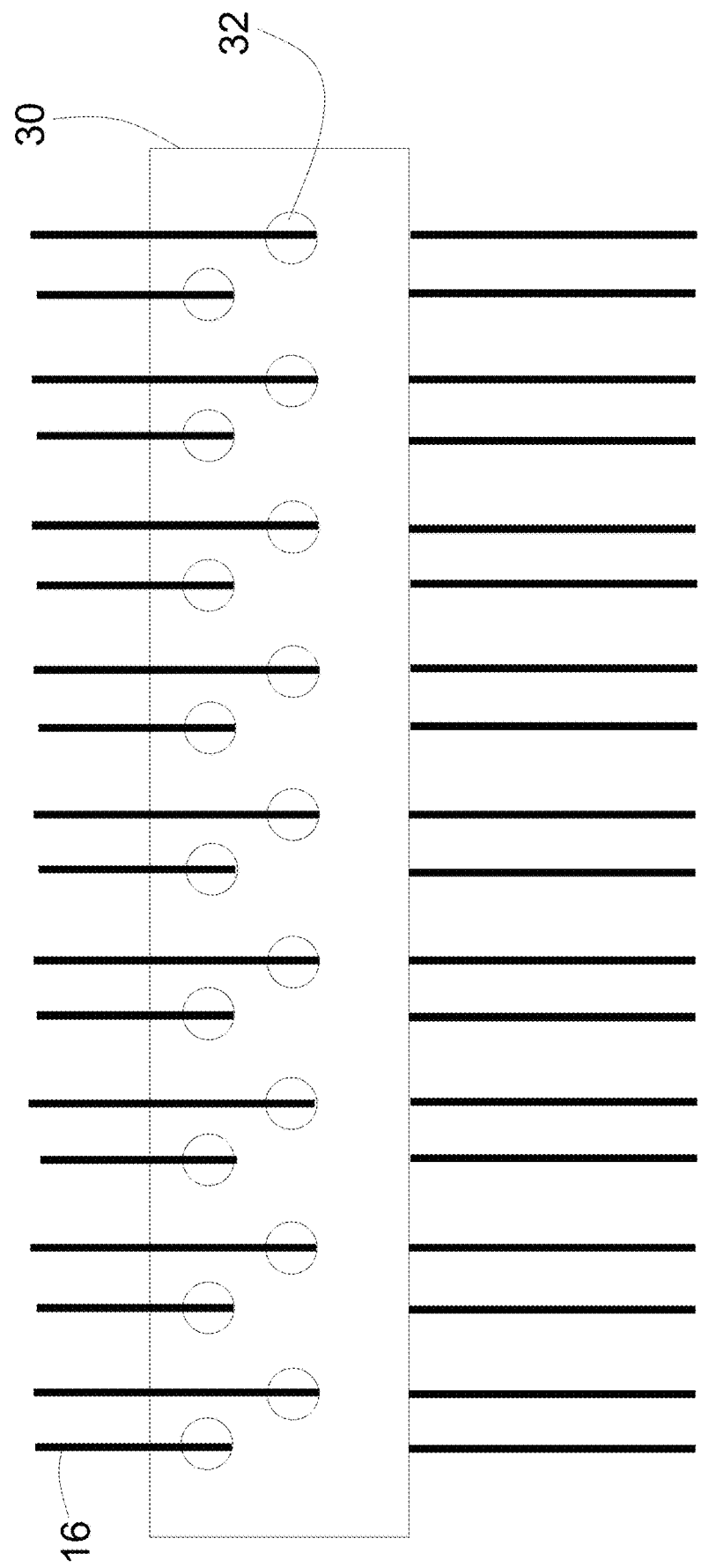
FIG. 2 is a perspective view of the sensor bar in accordance with the disclosed invention.

A top view of the sensor bar 30 is illustrated in FIG. 2 showing the multiple receiving eyelets 32, one for each strand of yarn 16. The receiving eyelets 32, each having an inlet and outlet and a designated sensor each having its own ID, are positioned within the sensor bar 30 to receive the yarn 16. Due to the use of optical sensors 50, 60 (shown in FIGS. 2A and 2B) and the algorithm capability, the angle of the yarn does not impact the performance or accuracy of readings. The eyelets within the sensor bar are not required to be in perfect alignment with a yarn guide. This makes retrofitting existing machines as well as the construction of new machines easier. The number of receiving eyelets 32 will vary depending on the machine capabilities. In FIGS. 2A and 2B the placement of the sensors 50 and 60, respectively, are illustrated.

Figure 3:
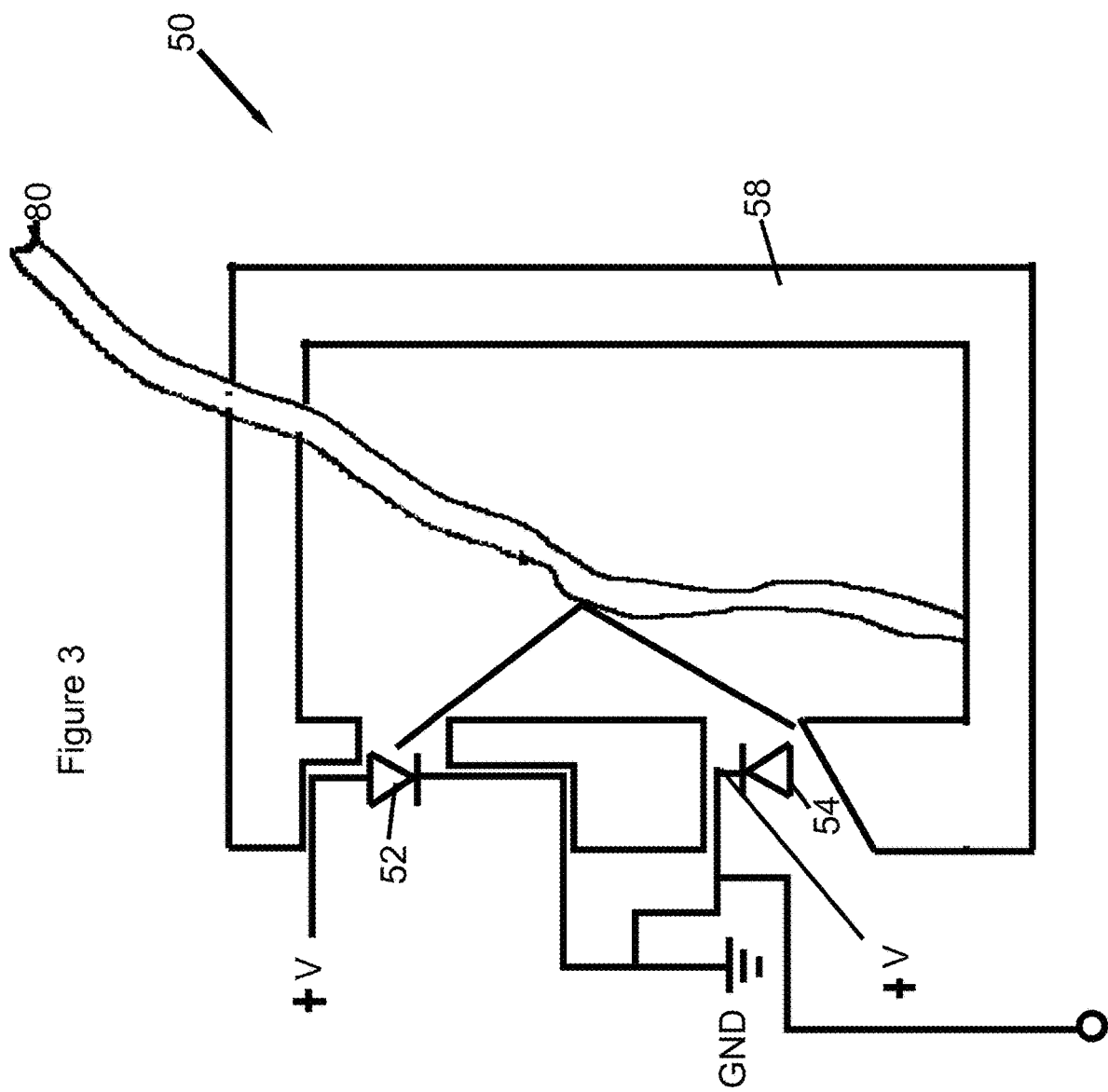
FIG. 3 is a schematic view of an example sensor configuration wherein the emitter and the detector are positioned to receive signals reflected off the yarn, in accordance with the disclosed invention.
Figure 4:
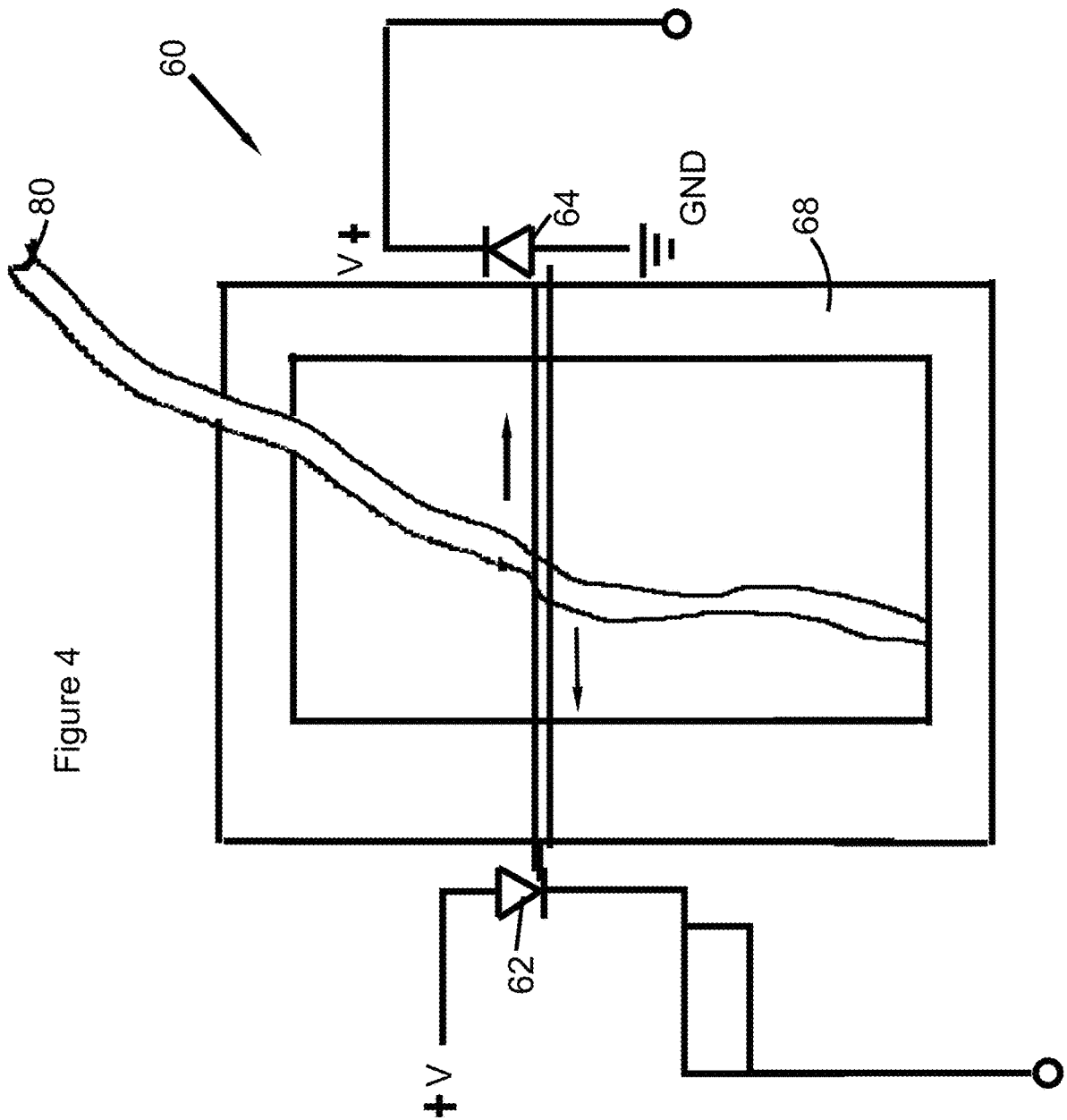
FIG. 4 is a schematic view of another example sensor configuration wherein the emitter and detector are positioned across from one another, in accordance with the disclosed invention.
Figure 9:
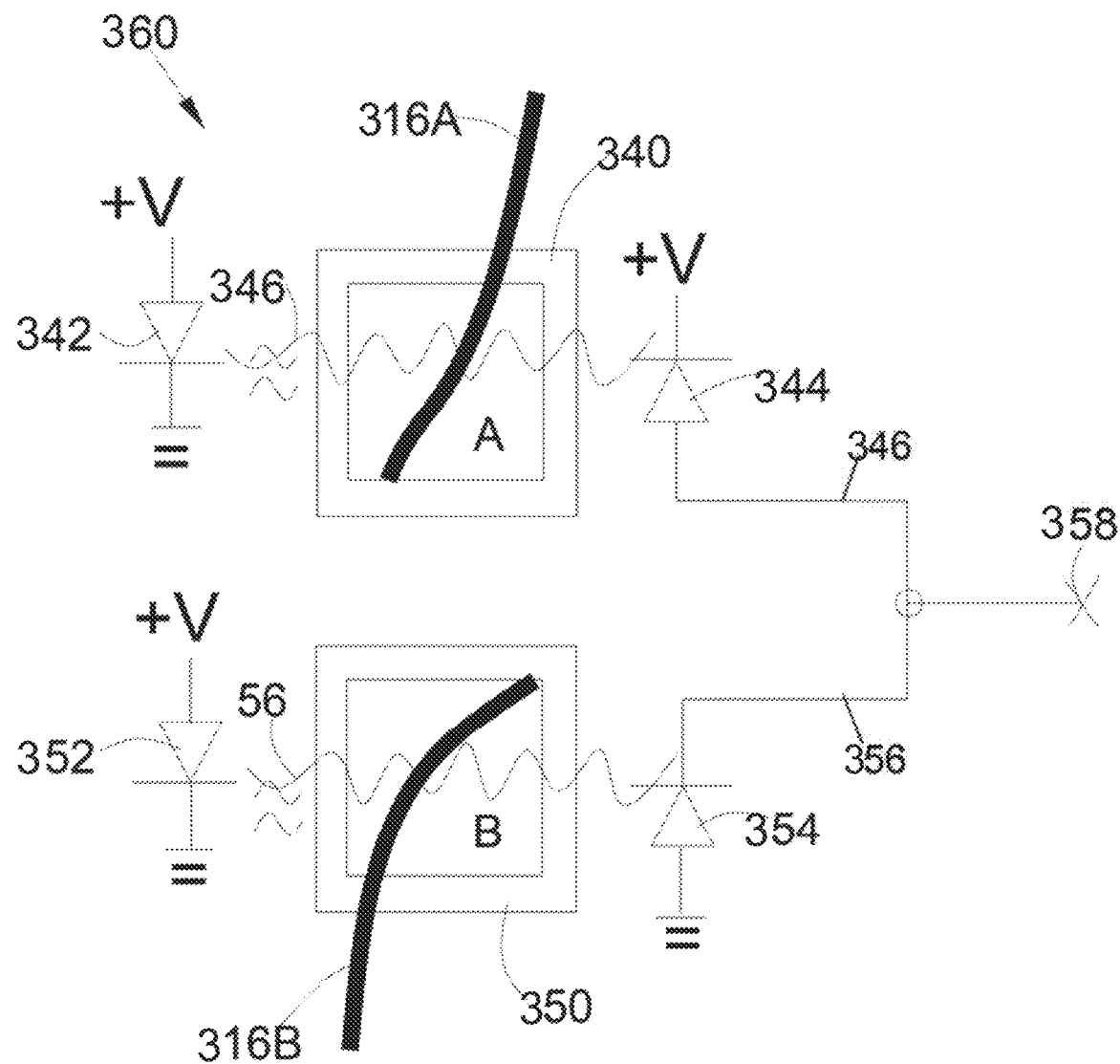
FIG. 9 is a schematic view of the dual sensors of a sensor system in accordance with the disclosed invention.

The disclosed system can also be applicable to using dual sensors as illustrated in FIG. 9 and described in more detail in the above identified co-pending application. Rather than the single sensor 50, 60 as illustrated in FIGS. 3 and 4, dual sensors 340 and 350 are incorporated into the eyelets. As seen in this figure, threads 316A and 316B pass through the receiving eyelets 332 and between the transmitting diode 342 and receiving diode 344 (sensor 40) and transmitting diode 352 and receiving diode 354 (sensor 50), which together form sensor pair 360.

In FIG. 3 the infrared emitter 52 and photo detector 54, forming reflective sensor 50, are positioned on one side of the eyelet 58 to read the motion of the yarn 80 based on the reflection of light from the yarn. The amount of light continuously sent from emitter 52 that is blocked by or allowed to pass yarn 80 is continuously read by detector 54 which creates a new signal that is sent to the controller 70. This new signal is an indication of the yarn being present and unbroken. The controller receives the new signal, and the algorithm run by the controller analyzes the new signal data being continuously received from the sensor to create an average time in milliseconds that the light is blocked and when it is allowed to pass (or signal strength per millisecond). This creation of an average time is referred to as "averaging" or "averaging yarn motion," and the value created based on this average time is referred to as "new signal average".

The averaging of the yarn, using either sensor 50 or 60, is based on the new signal received in milliseconds, indicating the motion of the yarn. The new signal average is part of a running average (next reading in and last reading dropped off). The algorithm analyzing the new signal data has some basic knowledge of the yarn being used in the system and its inherent properties, including movement or lack thereof, thereby reducing the time required to form an acceptable average. The empirical values inherent within the algorithm are tight end control limit, broken yarn control limit, factors for averaging of yarn motion, and features and characteristics of yarn types and textile machine types. The tight end control limit and broken yarn control limit are determined by routine experimentation and testing of different yarn types and different textile machines. Control limit testing is focused on capturing behavior of different kinds of yarn in different machines such as new signal highs and lows, new signal averages based on different sizes of yarn, and different speed and wiggle responses based on yarn angle entering the sensors. These and other factors can also be tested as determined by one skilled in the art.

Prior to initialization of the system, the user enters values, depending on yarn type and machine type, to the system that defines the actions that indicate a defect. These values would include the amount of time either a new signal or an averaged signal can remain below the control limits, specifically:

a. Broken yarn set point. The user enters a number establishing how many times the new signal can drop below the broken yarn control limit, after which it is determined that the yarn is broken. For example, for tufting yarn the new signal can drop below the broken yarn control limit for up to 100 consecutive new signal data readings; and b. Averaged tight end set point. The user enters a time in seconds for how long the running signal average can stay below the tight end control limit.

When a yarn is in the operational zone above the control limits, the yarn experiences wiggle that yields an acceptable variety of changes in new signal data and new signal averages. When a yarn starts to get tight, it does not wiggle as much; therefore, the amount of change in the new signal that the detector is seeing becomes more consistent with less wiggle. The algorithm recognizes the averaged reduction in wiggle, and after this reduction meets the user defined tight end set point and registers a defective yarn. If left without any action, the defective yarn will most likely break and fall below the broken yarn control limit, stopping the machine. How the system handles signals that fall below the broken yarn set point is based on user input.

In FIG. 4 the transmissive optical sensor 60 elements, emitter 62 and detector 64, are placed on either side of the eyelet 68. The emitter 62 sends continuous signals to the detector 64 with the algorithm averaging the amount of light blocked by the yarn and the amount of light that is received by the detector 64, reflecting the wiggle. As with the reflective sensor 50 above, when the preset amount of wiggle is disrupted with too much light being received by the detector 64, the algorithm recognizes that either the yarn is too tight or has broken.

The readings, whether reflective or transmissive, remain the same, thereby eliminating the need for any changes to the software. As there is no difference in the accuracy between the reflective and transmissive sensors the decision can be made on cost, thereby making the system more affordable.

As the emitter 52, 62 and detector 54, 64 are connected together the amplifier gain is automatically set so that the signal is always in the proper range. Any changes to this arrangement will require modifications as well known to those skilled in the art.

The software, or algorithm, analyzing the readings and sending instructions to the machine is part of the system along with the sensor bar and circuit board and therefore pre-programmed with the location and type of sensor being used. However, in some applications it can be advantageous to program the software to recognize the type of sensor and its location. Alternatively, individual programs can be contained with controller 70 and the user would select the applicable program to run.

The software within the controller 70 is in constant communication with the circuit board 31, monitoring the new data received regarding yarn motion, while simultaneously and continuously analyzing the data. When the readings indicate that a yarn is either under unacceptable tension, or there is a lack of yarn, the software institutes a protocol, as noted below, and a signal is sent to stop the machine.

Due to the ability of the basic algorithm to compensate for any change in yarn type or resulting signal change, the system does not need to redefine a zero baseline before each start up. The algorithm contains a number of basic values that are specific to yarn and machine type and never change, eliminating an initial set up of the averaging control limits. These basic values are automatically loaded upon machine start up and do not require entry at each run.

An important feature of the present invention is that the disclosed system does not require a predefined learning period as the algorithm uses the new signal data as read directly from the sensor 50, 60 to evaluate whether the yarn is below the tight end control limit. If the new signal data reading from the yarn is above the tight end control limit, the new signal data is added into the new signal average which is a running average. The running average is examined to see if the new data has brought the running average below the predefined tight end control limit. If the reading is below the tight end control limit, it defines a tight end. The tight end set point entered by the user define the number of times the running average is below the tight end control limit. Reaching the tight end control limit is based on the new signal average and is dependent on yarn type and machine type. As the new signal average is a running average, it is a real-time, ongoing calculation. A tight end set point is established by the user indicating the number of times that the new signal average can reach the control limit before a tight end defect is determined.

The broken yarn control limit is predefined by the system set up in the algorithm. The presence of a broken end is defined by the time below the broken yarn control limit which is entered by the user as the broken yarn set point.

Figure 6:
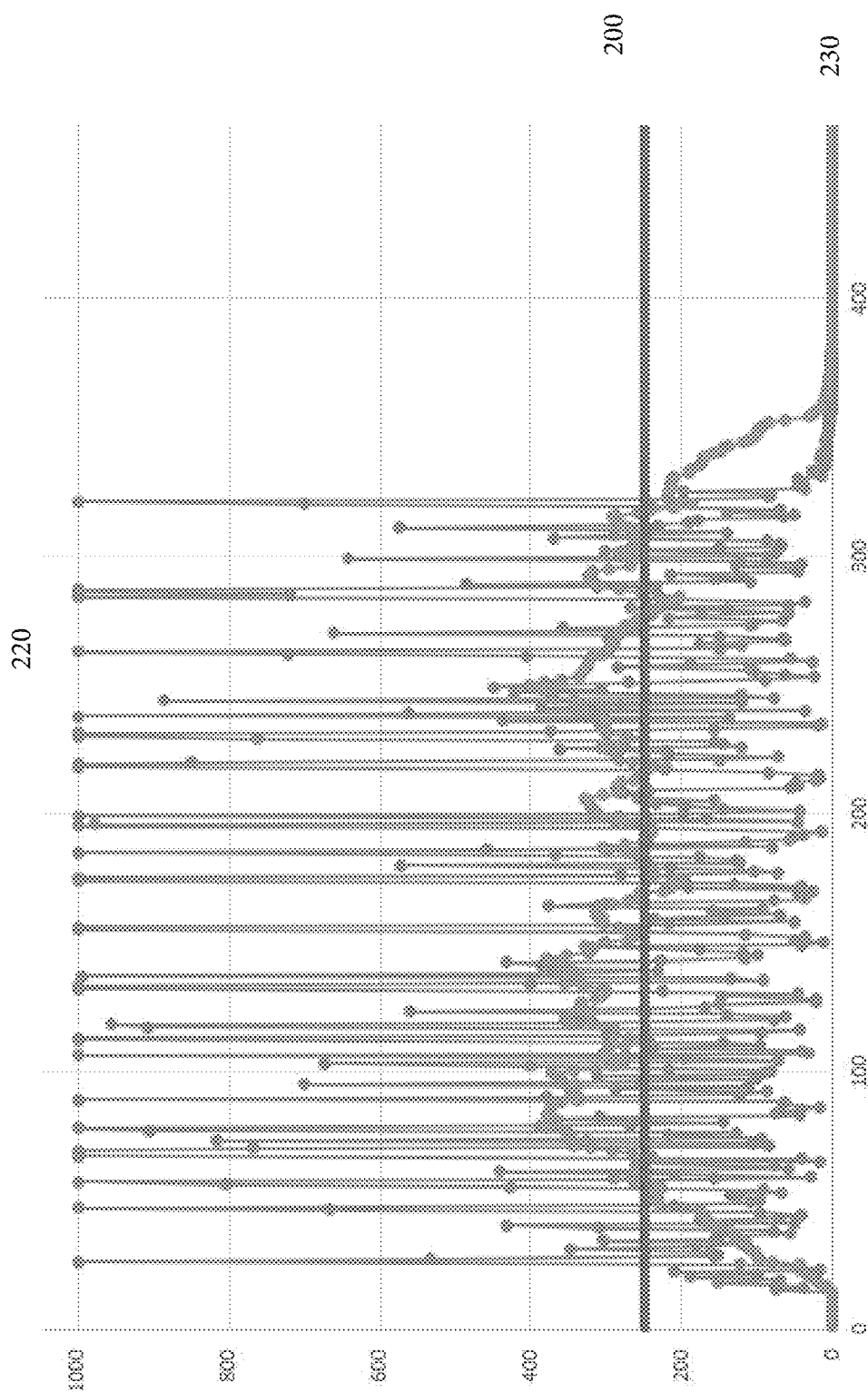
FIG. 6 is a graph illustrating signal readings indicating a tight, or overly tensioned, yarn in accordance with the invention.

The graph illustrated in FIG. 6 illustrates a tight end showing the new signal data 220 received by the sensors 50, 60, the new signal average 230 created by the sensors 50, 60 and the user set control limit 200. The time within which the new signal data 220 is received is displayed on the Y axis of the graph in milliseconds and the signal strength (volts) displayed on the X axis. Therefore, each millisecond the signal strength is recorded and added to the average, allowing the system to have an almost immediate response.

Figure 5:
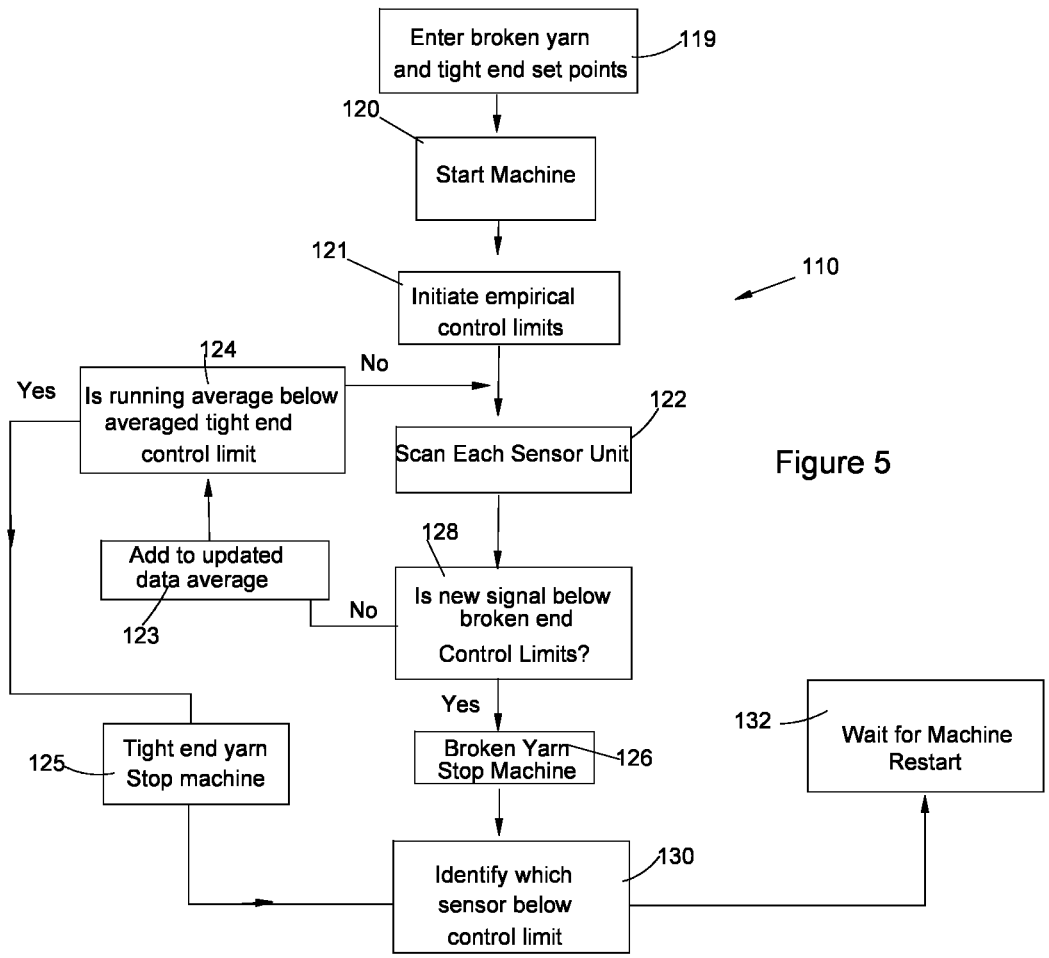
FIG. 5 is a flow chart illustrating the thread scanning steps in accordance with the disclosed invention.

The flow chart 110 in FIG. 5 shows the process of sensor system algorithm of the present invention to monitor yarn tension and breakage. As illustrated in FIG. 5, before the machine is started a user enters 119 broken yarn set point and tight end set point. As stated heretofore the broken yarn set point determines how long the new signal can stay below the control limit for broken yarn. The tight end set point controls number of times the averaged values can remain below the control limit for tight end. These are the user defined values that are enacted once the signals, new or averaged, fall below their respective control limits. Once the machine is started 120, the empirical tight end control limit and broken yarn control limit are initiated 121, and the system commences the continual scan 122 of the plurality of sensors within the sensor bar 30.

The new signal data received from the sensors is analyzed 128 to ensure that the speed and yarn motion fall into the predetermined operational area as defined by being above the broken yarn control limit. When the new signal is within the operational area, it is added to the current data average to the create an updated data average 123. The updated data average is then checked against the averaged tight end control limit to ensure that the averaged data remains in the operational area, above the tight end control limit. When the signals indicate that the yarn motion is above the averaged tight end control limits 124, the system loops back to scanning each sensor 122. This is a constant, ongoing process as the new signal is read in milliseconds.

If an averaged signal is below the average tight end control limit 124, the system checks the averaged set point as determined by user input 119, as noted above, and compares the number of times that the signal is below the control limit 124 with the user input 119. If the signal returns to above the averaged tight end control limit 124 and continues to stay within the operational area the process continues with the scanning of each sensor unit 122.

If the averaged signal continues to drop below the control limit 124 for the user input number of times, the tight end yarn stop machine signal 125 is sent, and the location of the sensor identified 130. Once the sensor issue has been resolved, the system waits for machine restart 132.

When the new signal is below the broken yarn control limit 128 the user entered broken yarn set point is checked. After the shutdown criteria is met, based on user set points 119, the software issues a stop machine command 126 and identifies the sensor containing the broken yarn 130. The system then waits for resolution and machine restart 132.

In this graph, the data average 230 has dipped below the tight end control limit 200 four (4) times but has always returned to the operational zone. On the fifth ($5^{th}$) dip, the new data 220 falls below the operational zone and stays beyond the user-established broken yarn set point, indicating a break. The dips below the control limit 200 are monitored and, even if the data average 230 returns to the operational zone, the number of the dips below the control limit 200 beyond the user-established by the averaged set point indicates a tight yarn.

Figure 7:
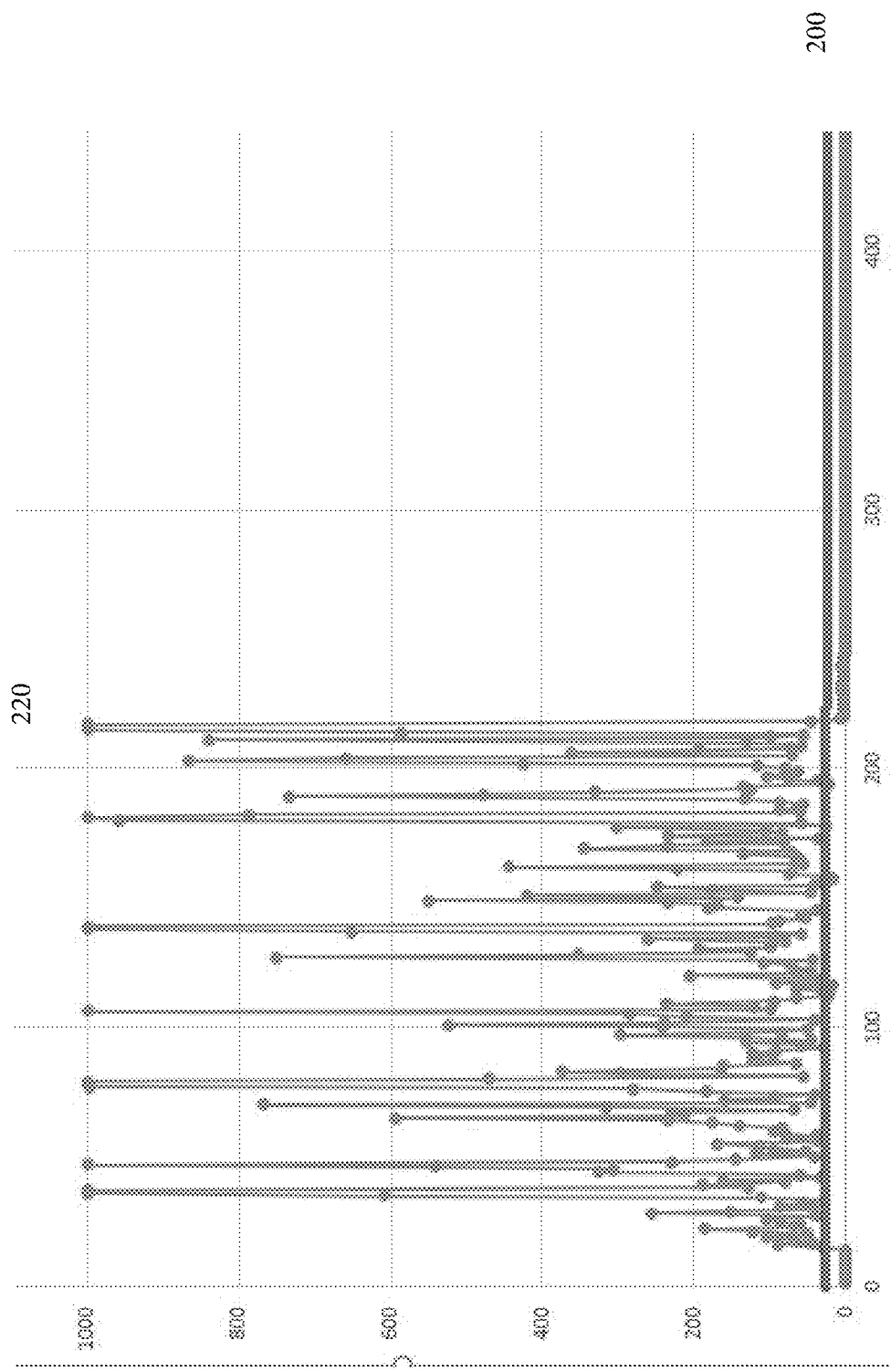
FIG. 7 is a graph illustrating signal readings from a broken yarn, in accordance with the invention.

In FIG. 7 the new data 222 shows a broken yarn. As with the tight end, the control limit for broken end is an empirical value in the software by machine/yarn type and the user only defines how long it stays below the control limit before a break is determined. In situations where the new signal is below the broken yarn control limit 128 for a time period exceeding the broken yarn set point, the system proceeds to stop the machine 126.

Figure 8:
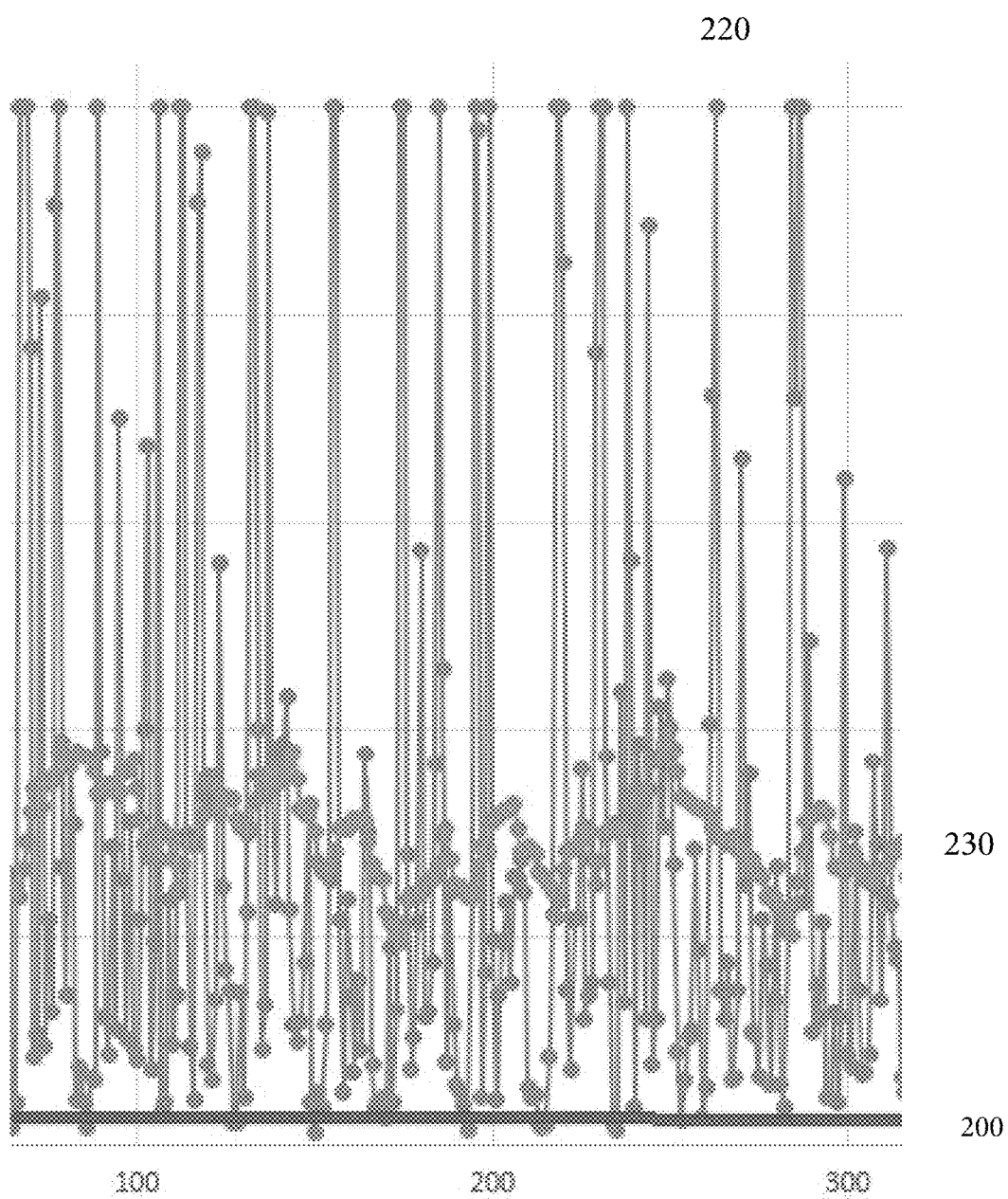
FIG. 8 is a graph illustrating signal readings from a standard yarn, in accordance with the invention.

In contrast to the graphs of FIGS. 6 and 7, the graph of FIG. 8 illustrates the signals 220 from the yarn remaining within the operational area. Although a few new signals 220 are below the control limit 200, they do not fall substantially below, the time spent below the control limit does not meet the broken yarn set point, and the data average 230 remains well within the operational area.

The use of the terms "a" and "an" and "the" and similar references in the context of this disclosure (especially in the context of the following claims) are to be construed to cover both the singular and the plural, unless otherwise indicated herein or clearly contradicted by context. AD methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure, and does not pose a limitation on the scope of the claims. No language in the specification should be construed as indicating any non-claimed element as essential to the practice of the preset disclosure.

Multiple embodiments are described herein, including the best mode known to the inventors for practicing the claimed invention. Of these, variations of the disclosed embodiments will become apparent to those of ordinary skill in the art upon reading the foregoing disclosure. The inventors expect skilled artisans to employ such variations as appropriate (e.g., altering or combining features or embodiments), and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The use of individual numerical values are stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately," In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 10%.

It is to be understood that any ranges, ratios, and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented.

What is claimed is:

1. A system for monitoring tension and breakage of yarn in a textile machine having:
 a sensor bar containing multiple eyelets to receive the yarn, each of the multiple eyelets containing at least one sensor to generate new signals as the yarn passes through each of the multiple eyelets; and
 a microprocessor containing software, the microprocessor when running the software being in communication with each of the at least one sensor to receive and analyze the new signals created by yarn motion, and in two-way communication with the textile machine, and configured to perform operations comprising:
 a. entering user defined broken yarn set point;
 b. entering user defined tight end set point;
 c. starting the machine;
 d. initiating by the software a predefined empirical broken yarn control limit inherent within the software;
 e. initiating by the software a predefined empirical tight end control limit inherent within the software;
 f. constantly scanning each of the at least one sensor;
 g. transmitting the new signals from each of the at least one sensor to the software run by the microprocessor; and
 h. continually analyzing the new signals from each of the at least one sensor to generate new signal data.

2. The system of claim 1 wherein steps f through h create a series of repeating analysis steps, wherein upon completion of each of the series of analysis steps each new signal data from each of the at least one sensor is compared to the predefined empirical broken yarn control limit.

3. The system of claim 2 further comprising an additional series step of determining if each new signal data are within an operational area of the predefined empirical broken yarn control limit.

4. The system of claim 3 further comprising an additional series step of initiating monitoring of the user defined broken yarn set point when the new signal data is below the predefined empirical broken yarn control limit.

5. The system of claim 2 further comprising an additional series step of creating a running signal average and adding each new signal data to the running signal average for an updated running data average.

6. The system of claim 4 further comprising an additional series step of issuing a broken yarn command to the machine when the new signal data is below the predefined empirical broken yarn control limit as defined by the user defined broken yarn set point.

7. The system of claim 6 wherein when the new signal data below the predefined empirical broken yarn control limit exceeds the user defined broken yarn set point, a stop command is sent by the software to the textile machine.

8. The system of claim 7 further comprising an additional series step of identifying the sensor transmitting signals below the user defined broken yarn set point.

9. The system of claim 5 further comprising an additional series step of comparing updated running data average to the predefined tight end empirical control limit.

10. The system of claim 9 further comprising an additional series step of determining if the updated running data average is below the predefined empirical tight end control limit.

11. The system of claim 10 further comprising an additional series step of initiating monitoring of the user defined tight end set point when the updated running signal data is below the predefined empirical tight end control limit.

12. The system of claim 11 further comprising an additional series step of issuing a tight end command when the updated running signal data is below the predefined empirical tight end control limit as defined by the user defined tight yarn set point.

13. The system of claim 12 wherein the tight end command exceeding the user defined tight end set point is a stop command.

14. A computer-implemented method for monitoring tension and breakage of yarn in a textile machine having a plurality of sensors within a sensor bar, each of the plurality of sensors monitoring a single yarn, the sensor bar being in communication with software within a microprocessor, the method comprising:
  a. entering user defined broken yarn set point into the software;
  b. entering user defined tight end set point into the software;
  c. starting the machine;
  d. initiating upon start-up of the machine software run on the microprocessor to initiate a predefined empirical broken yarn control limit inherent within the software;
  e. initiating upon start-up of the machine software run on the microprocessor to initiate a predefined empirical tight end control limit inherent within the software;
  f. scanning each of the sensors;
  g. transmitting new signals from each of the plurality of sensors to the software run on the microprocessor;
  h. continually analyzing the new signals from each of the plurality of sensors to generate new signal data;
  i. comparing the new signal data to the predefined empirical broken yarn control limit;
  j. determining if the new signal data are within an operational area of the predefined empirical broken yarn control limit and adding the new signal data to a running signal average for an updated running signal data average;
  k. initiating a stop command to the textile machine when the new signal data falls below the predefined empirical broken yarn control limit based on the user defined broken yarn set point;
  l. comparing the updated running signal data average to the predefined empirical tight end control limit;
  m. determining if the running signal data average is within an operational area of the predefined empirical tight end control limit;
  n. issuing a tensioned yarn command to the textile machine when the updated running signal data average is below the predefined empirical tight end control limit as defined by the tight end set point;
  wherein the new signal data below the predefined empirical broken yarn control limit as defined by the broken end set point initiates a stop command from the microprocessor to the textile machine; and,
  wherein the new signal data below the predefined empirical tight end control limit as defined by the tight end set point initiates a stop command from the microprocessor to the textile machine.

15. The system of claim 2 further comprising an additional series step of identifying each of the at least one sensor transmitting new signal data in at least one from the group of below limit and below predefined empirical tight end control limit.

16. The system of claim 1 wherein the software contains an algorithm to determine empirical values of at least one from the group of yarn motion, features of yarn types, characteristics of yarn types and textile machine types.

17. The system of claim 14 wherein the software executes steps to follow instructions comprising:
  a. comparing each new signal data from each of the at least one sensor to the predefined empirical broken yarn control limit to determine if each new signal data is within an operational area of the predefined the broken yarn control limit, and
  b. initiating the monitoring of the user defined broken yarn set point when the new signal data is below the predefined empirical broken yarn control limit and issuing a stop command when the user defined broken yarn set point is exceeded.

18. The system of claim 14 wherein the software executes steps to follow instructions comprising:
  a. creating a running signal data average; and
  b. adding each new signal data to the running signal average for an updated running data average;
  wherein each new updated running data average is compared to the predefined tight end empirical control limit to determine if the new updated running data average is within an operational area of the predefined tight end empirical control limit, and
  wherein a stop command is issued when the new updated running data average is below the predefined tight end empirical control limit when the user defined tight end set point is exceeded.

* * * * *